US008185541B2

(12) United States Patent
Kasai

(10) Patent No.: US 8,185,541 B2
(45) Date of Patent: May 22, 2012

(54) INFORMATION PROCESSING APPARATUS, INFORMATION PROCESSING METHOD, INFORMATION PROCESSING PROGRAM, REPRODUCTION DEVICE, AND INFORMATION PROCESSING SYSTEM THAT IDENTIFIES CONTENT USING A SIMILARITY CALCULATION

(75) Inventor: Kouichi Kasai, Saitama (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 12/552,052

(22) Filed: Sep. 1, 2009

(65) Prior Publication Data

US 2010/0057731 A1 Mar. 4, 2010

(30) Foreign Application Priority Data

Sep. 2, 2008 (JP) ................................ 2008-224971

(51) Int. Cl.
*G06F 17/30* (2006.01)

(52) U.S. Cl. ..................... 707/758; 707/975; 369/30.04; 369/47.12; 360/15

(58) Field of Classification Search .................. 707/758, 707/822, 975, 999.107, 999.006; 369/30.04, 369/47.12; 360/15
See application file for complete search history.

(56) References Cited

U.S. PATENT DOCUMENTS

| | | | | |
|---|---|---|---|---|
| 6,703,549 | B1 * | 3/2004 | Nishimoto et al. | 84/609 |
| 7,363,448 | B2 * | 4/2008 | Morita | 711/163 |
| 7,577,645 | B2 * | 8/2009 | Yamamoto et al. | 1/1 |
| 7,587,382 | B2 * | 9/2009 | Yamamoto et al. | 1/1 |
| 7,593,961 | B2 * | 9/2009 | Eguchi et al. | 1/1 |
| 7,603,023 | B2 * | 10/2009 | Kudo | 386/326 |
| 7,890,323 | B2 * | 2/2011 | Akamatsu | 704/230 |
| 7,904,964 | B1 * | 3/2011 | Risan et al. | 726/27 |
| 7,908,338 | B2 * | 3/2011 | Ogasawara | 709/217 |
| 7,949,703 | B2 * | 5/2011 | Matsuzaki et al. | 709/201 |
| 7,991,832 | B2 * | 8/2011 | Hatanaka et al. | 709/203 |
| 2008/0134340 | A1 * | 6/2008 | Ueda et al. | 726/26 |

FOREIGN PATENT DOCUMENTS

| | | |
|---|---|---|
| JP | 3-219486 | 9/1991 |
| JP | 3104628 | 10/2000 |
| JP | 2007-4886 | 1/2007 |
| JP | 2008-140440 | 6/2008 |

* cited by examiner

*Primary Examiner* — Leslie Wong
(74) *Attorney, Agent, or Firm* — Oblon, Spivak, McClelland, Maier & Neustadt, L.L.P.

(57) ABSTRACT

An information processing apparatus includes a communication unit configured to receive, from a reproduction device that reproduces content recorded on a loaded recording medium, content forming information regarding the structure of the content; a degree-of-similarity calculation unit configured to compare the content forming information received by the communication unit with content forming information registered in advance for each package of an information recording medium in a predetermined database and calculate a degree of similarity between the content forming information received by the communication unit and the content forming information registered in advance in the database; and a package determination unit configured to determine the package of the information recording medium loaded into the reproduction device by using the degree of similarity calculated by the degree-of-similarity calculation unit.

13 Claims, 10 Drawing Sheets

| Number Of Digest | Starting_HU_Num | Clip_Num | HU_Offset_in_Clip |
|---|---|---|---|
| #0 | Starting_HU_Num#0 | Clip_Num#0 | HU_Offset_in_Clip#0 |
| #1 | Starting_HU_Num#1 | Clip_Num#1 | HU_Offset_in_Clip#1 |
| ⋮ | ⋮ | ⋮ | ⋮ |
| #N – 1 | Starting_HU_Num#N – 1 | Clip_Num#N – 1 | HU_Offset_in_Clip#N – 1 |

| Number of Hash Unit | Content Hash |
|---|---|
| #0 | Content Hash #0 |
| #1 | Content Hash #1 |
| ⋮ | ⋮ |
| #i | Content Hash #i |

Clip #1
Clip #2
Hash Unit #0
Hash Unit #1
Hash Unit #2
Hash Unit #3
Hash Unit #4
Hash Unit #5
Hash Unit #6
Hash Unit #7
Content Hash #0
Content Hash #1
Content Hash #2
Content Hash #3
Content Hash #4
Content Hash #5
Content Hash #6
Content Hash #7
Digest #0
Digest #1

FIG. 7

| Syntax | BYTE |
|---|---|
| Certificate Type : $00_{16}$ | 0 |
| (reserved) | 1 |
| Total_Number_of_HashUnits | 2 TO 5 |
| Total_Number_of_Layers | 6 |
| Layer_Number | 7 |
| Number_of_HashUnits | 8 TO 11 |
| Number_of_Digests | 12,13 |
| Applicant ID | 14,15 |
| Content Sequent Number | 16 TO 19 |
| Minimum CRL Version | 20,21 |
| (reserved) | 22,23 |
| Length_Format_Specific_Section | 24,25 |
| Hash_Value_of_MC_Manifest_File | 26 TO 46 |
| Hash_Value_of_BDJ_Root_Cert | 47 TO 65 |
| Num_of_CPS_Unit | 66,67 |
| Hash_Value_of_CPS_Unit_Usage_File#1 | 68 TO 87 |
| ⋮ | ⋮ |
| Hash_Value_of_CPS_Unit_Usage_File#J | 68 + (J − 1) × 20 TO 87 + (J − 1) × 20 |
| Content Hash Table Digest #0 | K TO K + 7 |
| ⋮ | ⋮ |
| Content Hash Table Digest #N − 1 | K + (N − 1) × 8 TO K + 7 + (N − 1) × 8 |
| Signature Date | K + 8 + (N − 1) × 8 TO K + 47 + (N − 1) × 8 |

FIG. 8A

| Number Of Digest | Starting_HU_Num | Clip_Num | HU_Offset_in_Clip |
|---|---|---|---|
| #0 | Starting_HU_Num#0 | Clip_Num#0 | HU_Offset_in_Clip#0 |
| #1 | Starting_HU_Num#1 | Clip_Num#1 | HU_Offset_in_Clip#1 |
| ⋮ | ⋮ | ⋮ | ⋮ |
| #N – 1 | Starting_HU_Num#N – 1 | Clip_Num#N – 1 | HU_Offset_in_Clip#N – 1 |

FIG. 8B

| Number of Hash Unit | Content Hash |
|---|---|
| #0 | Content Hash #0 |
| #1 | Content Hash #1 |
| ⋮ | ⋮ |
| #i | Content Hash #i |

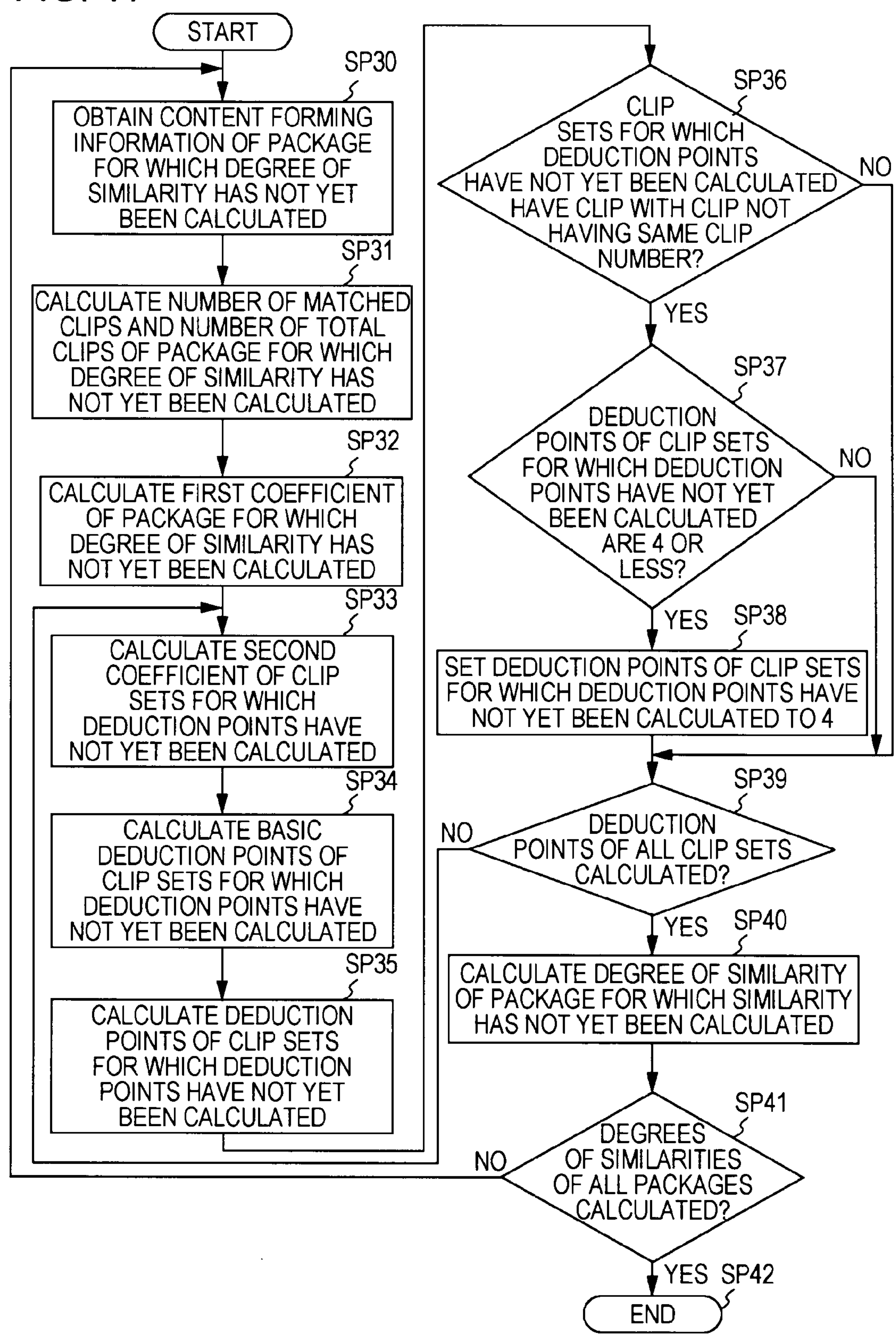
FIG. 11
SRT2
START
SP30
OBTAIN CONTENT FORMING INFORMATION OF PACKAGE FOR WHICH DEGREE OF SIMILARITY HAS NOT YET BEEN CALCULATED
SP31
CALCULATE NUMBER OF MATCHED CLIPS AND NUMBER OF TOTAL CLIPS OF PACKAGE FOR WHICH DEGREE OF SIMILARITY HAS NOT YET BEEN CALCULATED
SP32
CALCULATE FIRST COEFFICIENT OF PACKAGE FOR WHICH DEGREE OF SIMILARITY HAS NOT YET BEEN CALCULATED
SP33
CALCULATE SECOND COEFFICIENT OF CLIP SETS FOR WHICH DEDUCTION POINTS HAVE NOT YET BEEN CALCULATED
SP34
CALCULATE BASIC DEDUCTION POINTS OF CLIP SETS FOR WHICH DEDUCTION POINTS HAVE NOT YET BEEN CALCULATED
SP35
CALCULATE DEDUCTION POINTS OF CLIP SETS FOR WHICH DEDUCTION POINTS HAVE NOT YET BEEN CALCULATED
SP36
CLIP SETS FOR WHICH DEDUCTION POINTS HAVE NOT YET BEEN CALCULATED HAVE CLIP WITH CLIP NOT HAVING SAME CLIP NUMBER?
NO
YES
SP37
DEDUCTION POINTS OF CLIP SETS FOR WHICH DEDUCTION POINTS HAVE NOT YET BEEN CALCULATED ARE 4 OR LESS?
NO
YES
SP38
SET DEDUCTION POINTS OF CLIP SETS FOR WHICH DEDUCTION POINTS HAVE NOT YET BEEN CALCULATED TO 4
SP39
DEDUCTION POINTS OF ALL CLIP SETS CALCULATED?
NO
YES
SP40
CALCULATE DEGREE OF SIMILARITY OF PACKAGE FOR WHICH SIMILARITY HAS NOT YET BEEN CALCULATED
SP41
DEGREES OF SIMILARITIES OF ALL PACKAGES CALCULATED?
NO
YES
SP42
END

FIG. 12

| DATA NAME | SIZE (BYTE) |
| --- | --- |
| NUMBER OF CLIPS (N) | 2 |
| DISC SIZE | 8 |
| NUMBER OF LAYERS | 1 |
| CLIP NUMBER #0 | 2 |
| CLIP SIZE #0 | 8 |
| ⋮ | ⋮ |
| CLIP NUMBER #N – 1 | 2 |
| CLIP SIZE #N – 1 | 8 |

INFORMATION PROCESSING APPARATUS, INFORMATION PROCESSING METHOD, INFORMATION PROCESSING PROGRAM, REPRODUCTION DEVICE, AND INFORMATION PROCESSING SYSTEM THAT IDENTIFIES CONTENT USING A SIMILARITY CALCULATION

BACKGROUND OF THE INVENTION

1. Field of the Invention

The present invention relates to an information processing apparatus, an information processing method, an information processing program, a reproduction device, and an information processing system, and is suitably applied to a case in which a package of an information recording medium is to be detected.

2. Description of the Related Art

In recent years, as information recording media for content (for example, video data of movies and concerts), Blu-ray Discs (registered trademark, also referred to as BDs) capable of recording data of a size about five times as large as that of a DVD (Digital Versatile Disc) have appeared. In response to this, apparatuses that read and reproduce content recorded on a BD have been sold (hereinafter such devices will also be referred to as BD reproduction devices).

A system has been proposed in which, in a BD reproduction device, information (also referred to as content-associated information) associated with content recorded on a commercially available BD is obtained from an external server that is connected over a network and is provided to a user. For such a system, for example, a system in which a CCID (Content Certificate ID) recorded in a commercially available BD is used has been proposed (see, for example, Japanese Unexamined Patent Application Publication No. 2008-140440).

In a commercially available BD, certification for certifying that recorded content is legitimate is performed in AACS (Advanced Access Content System), which is a standard that prevents illegal copying of content so as to protect copyright before it is sold. Each time certification is performed, AACSLA (Advanced Access Content System License Administrator), which is a management organization of AACS for commercially available BDs, issues a content certificate, and this is recorded on the BD. A CCID is a management number for identifying the content certificate.

In the above-described system, when a commercially available BD is loaded, a BD reproduction device reads the CCID recorded on the BD and transmits it to the server. Then, a server obtains content-associated information corresponding to the CCID transmitted from a database stored in the server, and transmits the information to the BD reproduction device, thereby making it possible to provide such information to a user.

SUMMARY OF THE INVENTION

There is a case in which part of the structure of content recorded on a BD is changed because of a problem found after it is sold as a package. The package is a set for sale as a product, and the same package means the same product. In a case where part of the structure of content recorded on a BD has changed although the package has not changed in the manner described above, certification may be performed on the BD once more.

Furthermore, even with BDs having the same package, in a case where these are manufactured in different manufacturing factories, certification may also be performed in each manufacturing factory with respect to those BDs.

As described above, certification may be performed a plurality of times on the same package. At this time, a plurality of CCIDs exist with respect to one package.

Here, in order that the same content-associated information be provided to users in BDs of the same package, it is necessary to detect the packages of the BDs on which content-associated information is desired to be provided. Therefore, in the above-described system of the related art, in order to detect the package of the BD loaded into the BD reproduction device, it is considered that it is necessary to register which package each of all the CCIDs is linked to in a database in a server. However, it is very difficult for the manager of the database to grasp all the CCIDs issued to commercially available packages and to register in advance those CCIDs in the respective packages in such a manner as to be linked thereto.

Therefore, in the above-described system of the related art, there is a problem in that it is difficult to detect the package of a BD loaded into a BD reproduction device.

It is desirable to provide an information processing apparatus, an information processing method, an information processing program, a reproduction device, and an information processing system that are capable of easily detecting a package of an information recording medium loaded into a reproduction device.

According to an embodiment of the present invention, there is provided an information processing apparatus including: a communication unit configured to receive, from a reproduction device that reproduces content recorded on a loaded recording medium, content forming information regarding the structure of the content; a degree-of-similarity calculation unit configured to compare the content forming information received by the communication unit with content forming information registered in advance for each package of an information recording medium in a predetermined database and calculate a degree of similarity between the content forming information received by the communication unit and the content forming information registered in advance in the database; and a package determination unit configured to determine the package of an information recording medium loaded into the reproduction device by using the degree of similarity calculated by the degree-of-similarity calculation unit.

According to another embodiment of the present invention, there is provided a reproduction device including: a reproduction unit configured to reproduce content recorded on a loaded recording medium; a content forming information obtaining unit configured to obtain content forming information regarding the structure of the content; and a communication unit configured to transmit the content forming information obtained by the content forming information obtaining unit to an information processing apparatus that receives the content forming information, compares the received content forming information with content forming information registered in advance for each package of an information recording medium in a predetermined database, calculates a degree of similarity between the received content forming information and the content forming information registered in advance in the database, and determines the package of the loaded information recording medium by using the calculated degree of similarity.

According to another embodiment of the present invention, there is provided an information processing system including: a reproduction device including a reproduction unit configured to reproduce content recorded on a loaded recording medium, a content forming information obtaining unit configured to obtain content forming information regarding the structure of the content, and a communication unit configured to transmit the content forming information obtained by the content forming information obtaining unit to the outside; and an information processing apparatus including a communication unit configured to receive the content forming information from the reproduction device, a degree-of-similarity calculation unit configured to compare the content forming information received by the communication unit with content forming information registered in advance for each package of an information recording medium in a predetermined database, and calculate a degree of similarity between the content forming information received by the communication unit and the content forming information registered in advance in the database, and a package determination unit configured to determine the package of the loaded information recording medium loaded into the reproduction device by using the degree of similarity calculated by the degree-of-similarity calculation unit.

As a result of the above, according to the embodiments of the present invention, it is possible to detect the package of an information recording medium loaded into a reproduction device even if a difficult operation of pre-registering which package each of all the CCIDs is linked to in a database is not performed.

According to the embodiments of the present invention, it is possible to detect the package of an information recording medium loaded into a reproduction device even if a difficult operation of pre-registering which package each of all the CCIDs is linked to in a database is not performed. Thus, it is possible to realize an information processing apparatus, an information processing method, an information processing program, a reproduction device, and an information processing system that are capable of easily detecting the package of an information recording medium loaded into a reproduction device.

BRIEF DESCRIPTION OF THE DRAWINGS

FIG. 7 is a schematic diagram showing the data structure of a Content000.cer file;

FIGS. 8A and 8B are schematic diagrams showing the data structure of a ContentHash000.tbl file;

FIG. 11 is a flowchart showing a degree-of-similarity calculation processing procedure; and FIG. 12 is a schematic diagram showing the data structure of content forming information.

DESCRIPTION OF THE PREFERRED EMBODIMENTS

Embodiments of the present invention will be described in detail below with reference to the drawings.

(1) Configuration of Content-Associated Information Providing System

Figure 1:
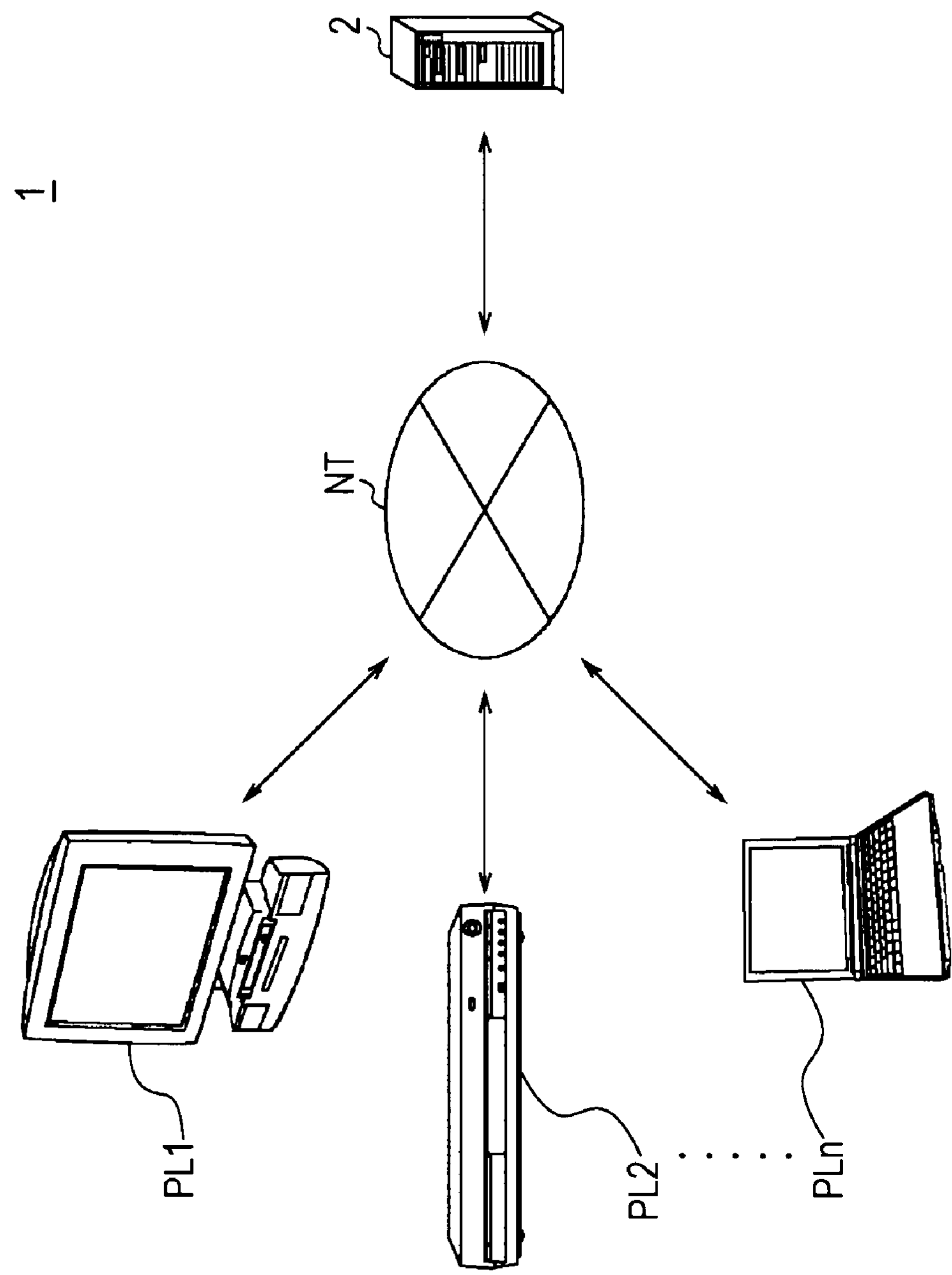
FIG. 1 is a block diagram showing the configuration of a content-associated information providing system.

FIG. 1 shows the configuration of a content-associated information providing system 1. The content-associated information providing system 1 includes a plurality of BD reproduction devices PL (PL1, PL2, . . . , PLn) that read and reproduce information regarding content recorded on a BD. Furthermore, the content-associated information providing system 1 includes a server 2 that provides content-associated information corresponding to the package of a BD loaded into the BD reproduction device PL to the BD reproduction device PL via a network NT. In the case of, for example, a BD on which a movie has been recorded, the content-associated information is data, such as the title of the produced work, the director's name, and the jacket photograph, and is registered in advance for each commercially available package in a database (also referred to as a BDDB) stored in the server 2.

More specifically, when a commercially available BD is loaded, each of a plurality of BD reproduction devices PL constituting the content-associated information providing system 1 obtains, from the BD, information regarding the structure of the content (also referred to as content forming information) recorded on the BD. Then, the BD reproduction device PL transmits the content forming information to the server 2 via the network NT.

By using the content forming information transmitted from the BD reproduction device PL, the server 2 detects, from the BDDB, the package of the BD loaded into the BD reproduction device PL. In the BDDB, content forming information is registered in advance for each commercially available package. Then, the server 2 obtains the content-associated information corresponding to the detected package from the BDDB, and transmits the content-associated information to the BD reproduction device PL via the network NT. When the content-associated information is transmitted from the server 2, the BD reproduction device PL causes a display unit to display the information. In the manner described above, the content-associated information providing system 1 detects the package of the BD loaded into the BD reproduction device PL and provides the content-associated information corresponding to the package to a user.

(2) Configuration of BD REPRODUCTION DEVICE and Server

Next, a description will be given of the configuration of the BD reproduction device PL and the server 2 of the content-associated information providing system 1 described above. The configuration of the BD reproduction device PL will be described first.

Figure 2:
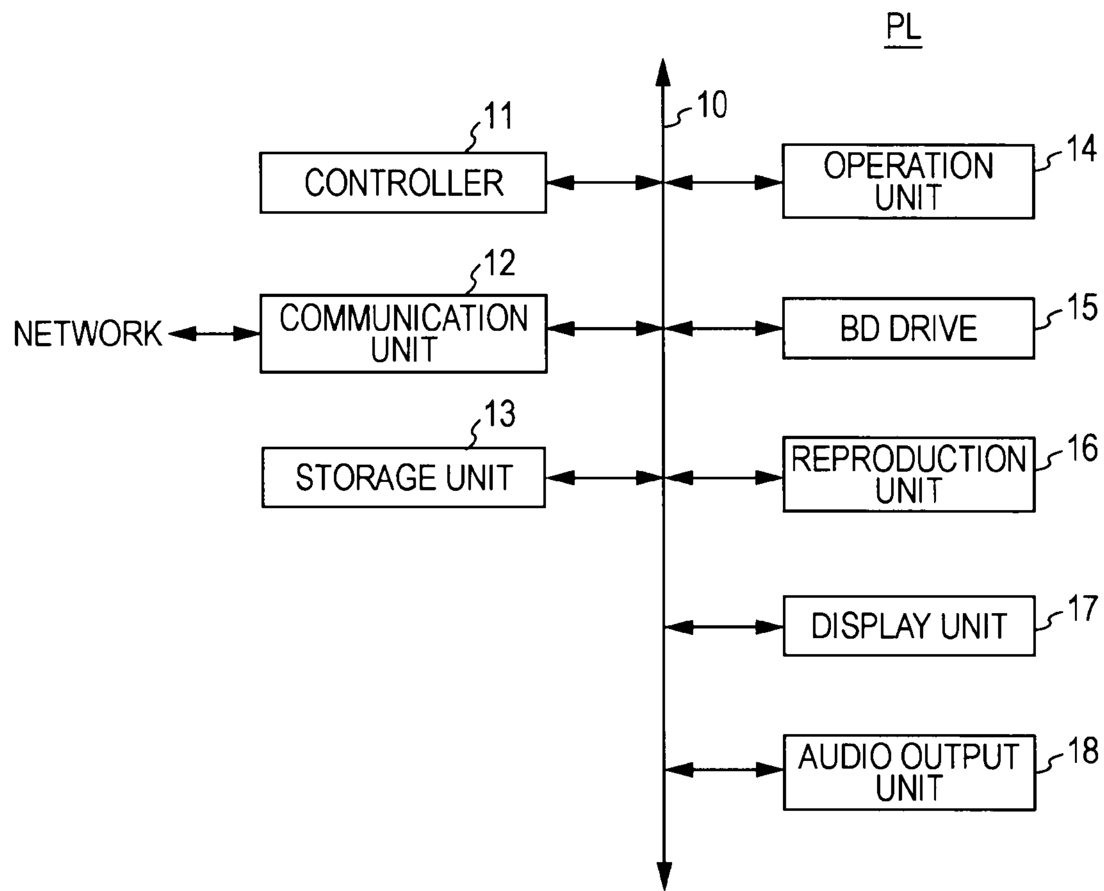
FIG. 2 is a block diagram showing the configuration of a BD reproduction device.

As shown in FIG. 2, the BD reproduction device PL includes a controller 11, a communication unit 12, a storage unit 13, an operation unit 14, a BD drive 15, a reproduction unit 16, a display unit 17, and an audio output unit 18, with the units being connected through a bus 10.

The controller 11 of the BD reproduction device PL executes various kinds of processing in accordance with programs stored in the storage unit 13 and also controls the operation of each unit in response to an operation signal input via the operation unit 14.

More specifically, when the reproduction of the BD is instructed through the operation of the operation unit 14, under the control of the controller 11, the BD reproduction device PL reads content, that is, video data and audio data recorded on the BD loaded into the BD drive 15, and inputs the data to the reproduction unit 16.

The reproduction unit 16 performs processing, such as decoding, on each of the input video data and audio data so as to obtain a video signal and an audio signal, inputs the video signal to the display unit 17, and inputs the audio signal to the audio output unit 18.

As a result, the video recorded on the BD is output from the display unit 17, and the audio recorded on the BD is output from the audio output unit 18. In the manner described above, the BD reproduction device PL reads and reproduces the content recorded on the BD loaded into the BD drive 15.

Furthermore, under the control of the controller 11, the BD reproduction device PL obtains, from the BD, the content forming information of the BD loaded into the BD drive 15. Then, under the control of the controller 11, the BD reproduction device PL transmits the content forming information to the server 2 via the communication unit 12.

After the content forming information is transmitted to the server 2 in the manner described above, when content-associated information corresponding to the package of the BD loaded into the BD drive 15 is transmitted from the server 2, the BD reproduction device PL receives this information via the communication unit 12 and inputs it to the display unit 17.

As a result, the content-associated information corresponding to the package of the BD loaded into the BD drive 15 is output from the display unit 17. In the manner described above, the BD reproduction device PL obtains the content forming information of the BD loaded into the BD drive 15 and transmits the content forming information to the server 2, so that the content-associated information corresponding to the package of the BD is obtained from the server 2 and is displayed on the display unit 17, thereby providing the content-associated information to the user.

Figure 3:
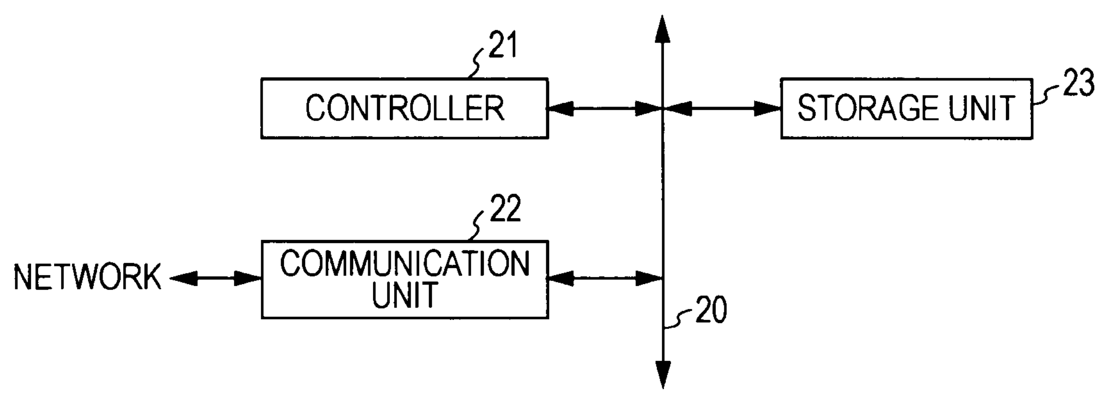
FIG. 3 is a block diagram showing the configuration of a server.

Next, the configuration of the server 2 will be described. As shown in FIG. 3, the server 2 includes a controller 21, a communication unit 22, and a storage unit 23, with the units being connected through a bus 20.

More specifically, when the content forming information of the BD loaded into the BD reproduction device PL is transmitted from the BD reproduction device PL, under the control of the controller 21, the server 2 receives the content forming information via the communication unit 22.

Under the control of the controller 21, by using the content forming information transmitted from the BD reproduction device PL, the server 2 detects the package of the BD loaded into the BD reproduction device PL from the BDDB stored in advance in the storage unit 23.

Then, under the control of the controller 21, the server 2 obtains the content-associated information corresponding to the detected package from the BDDB and transmits the content-associated information to the BD reproduction device PL via the communication unit 22.

In the manner described above, by using the content forming information transmitted from the BD reproduction device PL, the server 2 detects the package of the BD loaded into the BD reproduction device PL, and provides the content-associated information corresponding to the package to the BD reproduction device PL.

(3) Method of Obtaining Content Forming Information

Next, a description will be given in detail of a method in which the BD reproduction device PL obtains, from a BD, content forming information of the BD loaded into the BD drive 15.

In the present embodiment, content forming information is information formed of, for example, the total number of layers, the total number of clips, the ordinal number of each clip, the stream size of each clip, and the total stream size of all the clips.

Under the control of the controller 11, the BD reproduction device PL obtains the content forming information on the basis of the data (also referred to as stored data) stored on the BD loaded into the BD drive 15. Accordingly, first, the structure of data stored on a BD will be described in detail.

(3-1) Structure of Data Stored on BD

Figure 4:
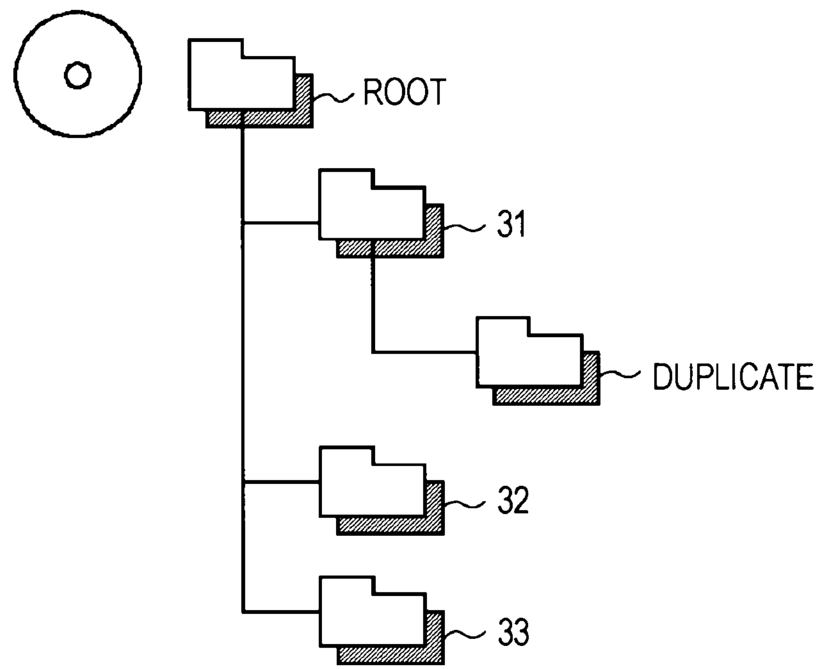
FIG. 4 is a schematic diagram showing the structure of directories of data stored on a BD.

FIG. 4 shows the directory structure of data stored on a BD. The data stored on a BD is mainly recorded in three directories (an AACS directory 31, a BDMV directory 32, a CERTIFICATE directory 33). In the AACS directory 31, as information (also referred to as certification information) indicating that certification has been performed on the BD by AACSLA (Advanced Access Content System Licensing Administrator), a content certificate, a content hash table, and the like are stored. In the BDMV directory 32, content, such as stream files in which video data and audio data are stored, content management data, an encryption key used to decrypt content, and the like are stored. In the CERTIFICATE directory 33, a root certificate, for example, a public key certificate having stored therein a public key used to verify the signature of a content reproduction application, is stored.

Figure 5:
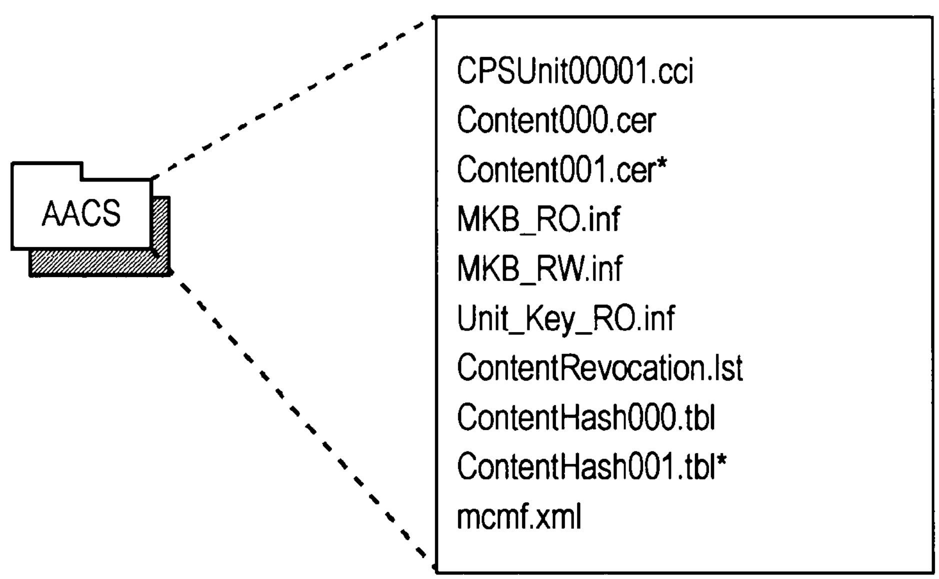
FIG. 5 is a schematic diagram showing files recorded in an AACS directory.

Next, files recorded in the AACS directory 31 are shown in FIG. 5. A Content000.cer file and a Content001.cer file shown in FIG. 5 are files formed from the above-described content certificates, and have data for verifying the electronic signature by AACSLA and the presence or absence of tampering of content. The files are created for corresponding layers of the BD. The Content000.cer file corresponds to layer 0, and the Content001.cer file corresponds to layer 1. Therefore, the Content001.cer file exists in only the BD having two layers (layer 0 and layer 1).

A ContentHash000.tbl file and a ContentHash001.tbl file, shown in FIG. 5, are files formed from the content hash table described above. The files are created for each layer of the BD. The ContentHash000.tbl file corresponds to the layer 0, and the ContentHash001.tbl file corresponds to the layer 1. Therefore, the ContentHash001.tbl file exists in only the BD having two layers.

Here, the content hash table is a table in which content hashes calculated on the basis of content recorded in the BDMV directory 32 are recorded. The content hash is a hash value calculated for each hash unit (Hash Unit) set in the content. The size of the hash unit is, for example, a size such that the sector size (2048 B) is multiplied by 96.

The content hash table is used for, for example, a content tampering verification process, which is performed by the BD reproduction device PL, before content recorded on the BD is reproduced. For example, the controller 11 of the BD reproduction device PL selects the hash unit set to the content that has been reproduced, and calculates a hash value in accordance with a predetermined hash value calculation algorithm. Then, the controller 11 of the BD reproduction device PL verifies whether or not the content has been tampered in accordance with whether or not the hash value calculated at this time matches the content hash recorded in the content hash table.

Figure 6:
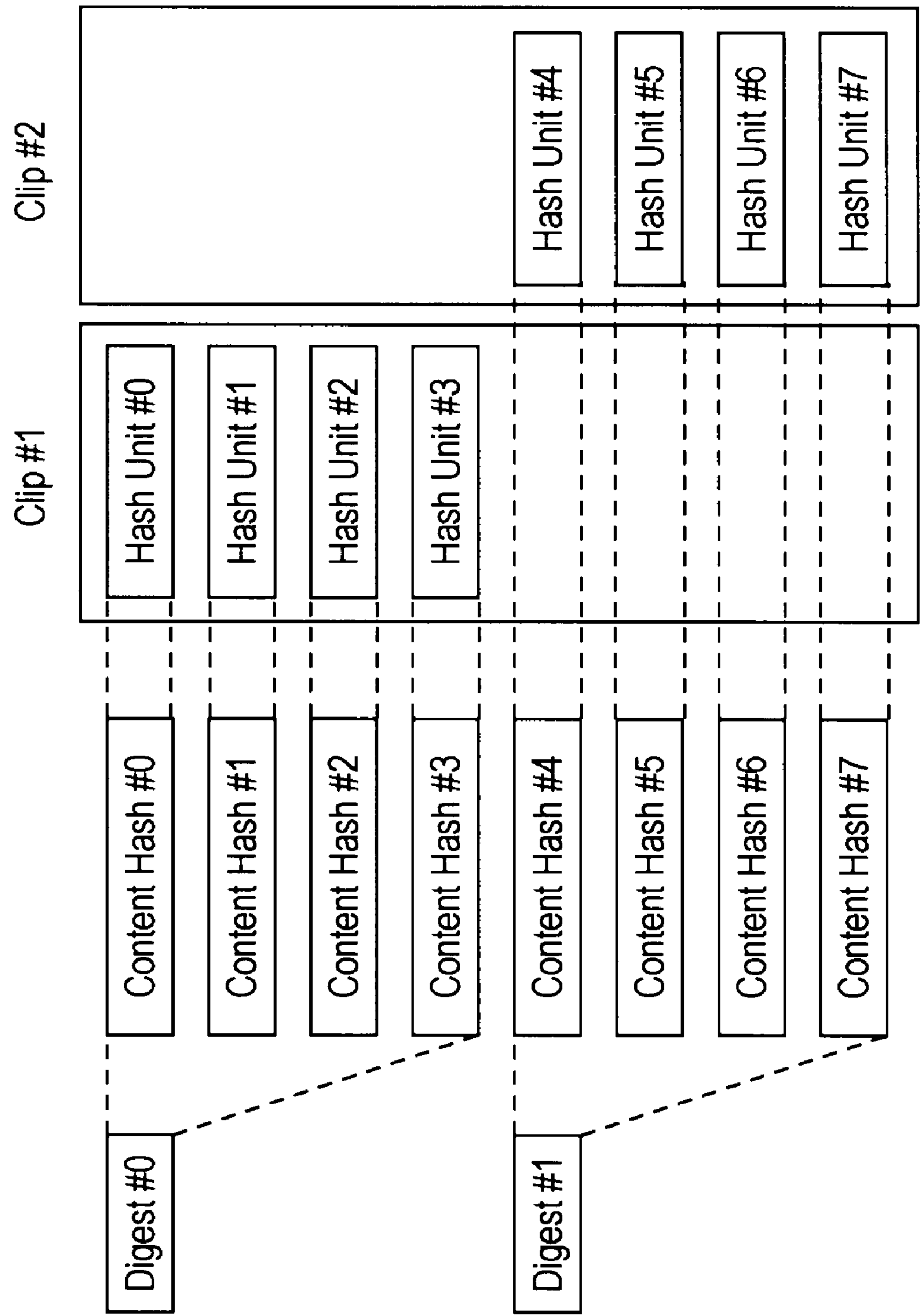
FIG. 6 is a schematic diagram showing the relationship among content hash table digests, hash values, clips, and hash units.

In the Content000.cer file or in the Content001.cer file, hash values calculated from the content hashes are recorded as content hash table digests (Digests). Here, the relationship among content hash table digests, content hashes, clips, and hash units is shown in FIG. 6. As shown in FIG. 6, the content hash table digest is generated for each clip forming content.

Next, the data structure of the Content000.cer file, which is a file formed from the content certificate described above, is shown in FIG. 7. This structure is the same for the Content001.cer file.

Total_Number_Of_HashUnits shown in FIG. 7 indicates the total number of hash units in the entire BD. Total_Number_Of_Layers indicates the total number of layers in the entire BD. Number_Of_HashUnits indicates the number of hash units in the layer 0. Number_Of_Digests indicates the number of content hash table digests in the layer 0. Since the content hash table digest is generated for each clip, Number_Of_Digests also indicates the number of clips in the layer 0. ContentHashTableDigests #0 to #N−1 each indicate the value of the content hash table digest corresponding to each clip in the layer 0 (#0 to #N−1 denote the ordinal number of each clip).

Furthermore, the data structure of the ContentHash000.tbl file, which is a file formed from the content hash table described above, is shown in FIGS. 8A and 8B. This structure applies the same for the ContentHash001.tbl file.

As shown in FIG. 8A, in the table of the content hash table digest (Digest), Starting_HU_Num, Clip_Num, and HU_Offset_in_Clip are recorded for each content hash table digest. Starting_HU_Num is the ordinal number of the hash unit, and indicates the first ordinal number of the hash unit used to generate each content hash table digest. Clip_Num is the ordinal number of the clip, and indicates which clip each content hash table digest corresponds to. HU_Offset_in_Clip indicates whether or not the clip corresponding to each content hash table digest extends over the layers. Furthermore, as shown in FIG. 8B, in the table of the hash unit (Hash Unit), a content hash, which is a hash value calculated for each hash unit, is recorded with respect to each hash unit.

(3-2) Method of Obtaining Content Forming Information

Next, a description will be given of a method of obtaining the above-described content forming information. As described above, the content forming information is information formed from the total number of layers, the total number of clips, the ordinal number of each clip, the stream size of each clip, and the total stream size of all the clips. These items of information are detected from content certificates (the Content000.cer file and the Content001.cer file) and content hash tables (the ContentHash000.tbl file and the ContentHash001.tbl file).

(3-2-1) Method of Detecting Number of Layers

First, a description will be given below of a method of detecting the total number of layers (hereinafter also referred to as the number of layers). Since the number of layers is the same as the value of Total_Number_Of_Layers in the Content000.cer file described above, the value is set directly as the number of layers.

(3-2-2) Method of Detecting Number of Clips

Next, a description will be given of a method of detecting the total number of clips (hereinafter also referred to as the number of clips). In a case where the number of layers is 1, since the number of clips is the same as the value of Number_Of_Digest in the Content000.cer file described above, the value is set directly as the number of clips.

Furthermore, in a case where the number of layers is 2, the method of detecting the number of clips differs depending on whether or not a clip that extends over the layers exists. Whether or not a clip that extends over the layers exists can be determined on the basis of the value of HU_Offset_in_Clip in the ContentHash000.tbl file and the ContentHash001.tbl file. In a case where the values of all of HU_Offset_in_Clips in these files are 0, this indicates that there are no clips that extend over the layers. Furthermore, in a case where a clip whose value of HU_Offset_in_Clip is not 0 exists, this indicates that a clip that extends over the layers exists.

Then, in a case where the number of layers is 2 and a clip that extends over the layers does not exist, the number of clips is detected by totaling Number_Of_Digests in the Content000.cer file and the Content001.file described above.

On the other hand, in a case where the number of layers is 2, a clip that extends over the layers exists, the number of clips is detected by subtracting 1 from the value such that Number_Of_Digest in the Content001.cer file and that in the Content000.cer file are totaled.

(3-2-3) Method of Detecting Clip Number

Next, a description will be given of a method of detecting the ordinal number of each clip (hereinafter also referred to as a clip number). Since the clip number is the same as the value of the Clip_Num in the ContentHash000.tbl file and the value in the ContentHash001.tbl file, the value is directly set as the clip number.

(3-2-4) Method of Detecting Clip Size

Next, a description will be given of a method of detecting the stream size of each clip (hereinafter also referred to as a clip size). First, a description will be given below of a method of calculating the number of hash units in each clip.

In the case of not being the end clip (clip having the largest clip number in each layer) of each layer, the number of hash units in the clip is calculated using Starting_HU_Num in the ContentHash000.tbl file and the ContentHash001.tbl file.

Figure 9:
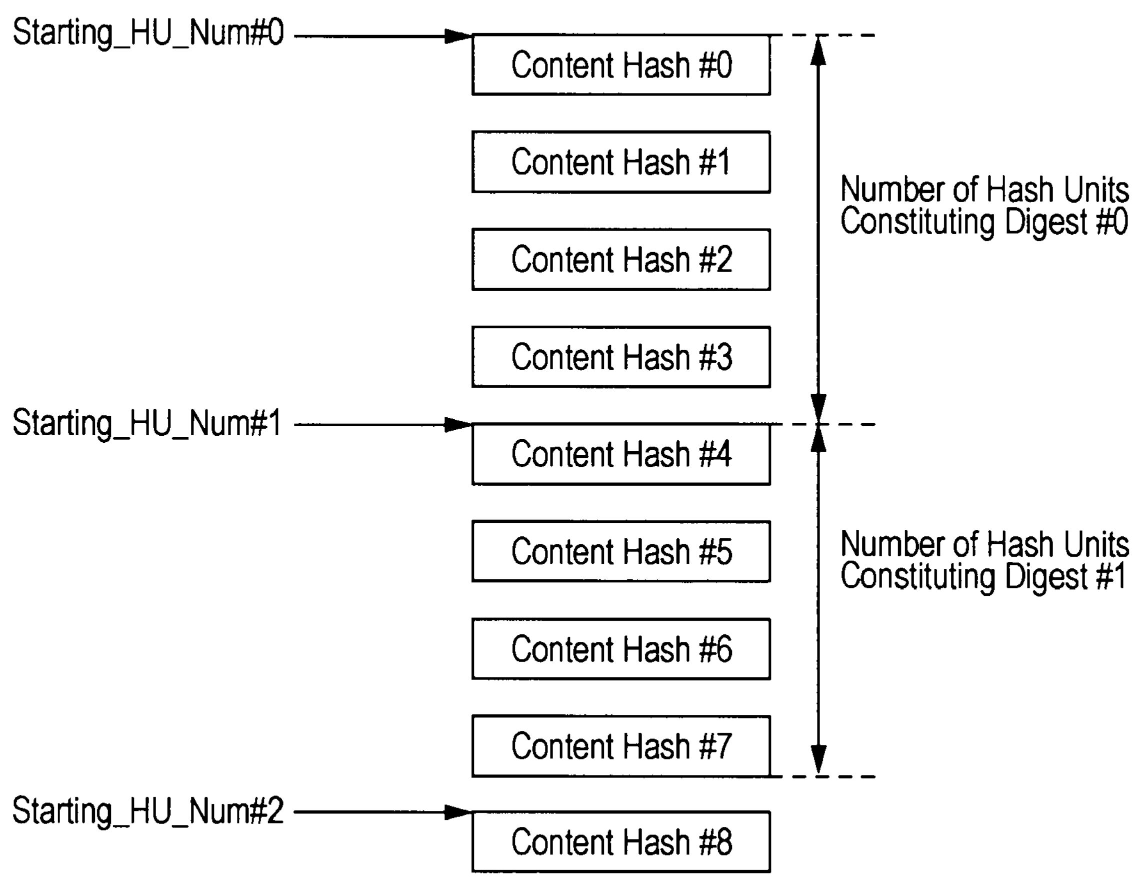
FIG. 9 is a schematic diagram showing the relationship between Starting_HU_Num and the number of hash units.

FIG. 9 shows the relationship between Starting_HU_Num and the number of hash units. Starting_HU_Num indicates the first ordinal number of the hash unit used to generate a content hash table digest in each clip. For example, in the case of Digest #0 shown in FIG. 9, Starting_HU_Numis ContentHash #0, and in the case of Digest #1, Starting_HU_Num is ContentHash #4. The number of hash units in each clip can be calculated on the basis of the difference between the content hash table digest corresponding to the clip and Starting_HU_Num of the next content hash table digest. That is, the number of hash units in the clip corresponding to Digest #0 shown in FIG. 9 is 4.

Furthermore, in the case of the end clip of the layer 0, the number of hash units in the clip can be calculated by calculating the difference between Number_Of_HashUnits in the Content000.cer file and Starting_HU_Num in the ContentHash000.tbl file. Number_Of_HashUnits is the number of hash units in the layer 0 corresponding to the Content000.cer file.

Furthermore, in the case of the end clip of the layer 1, the number of hash units in the clip can be calculated by calculating the difference between Total_Number_Of_HashUnits in the Content000.cer file and Starting_HU_Num in the ContentHash000.tbl file. Total_Number_Of_HashUnits indicates the total number of hash units in the entire BD.

Then, in the present embodiment, the size of one hash unit is a size such that the sector size (2048 B) is multiplied by 96.

Therefore, each clip size can be detected by multiplying the number of hash units in each clip, which is calculated by the above-described method, by the size of one hash unit.

(3-2-5) Method of Detecting Disc Size

Next, a description will be given of a method of detecting the total stream size (hereinafter also referred to as a disc size) of all the clips. Total_Number_Of_HashUnits in the Content000.cer file indicates the total number of hash units in the entire BD. Therefore, the disc size can be detected by multiplying Total_Number_Of_HashUnits by the size of the above-described one hash unit.

By using the above-described method, the controller 11 of the BD reproduction device PL is able to detect the number of layers, the number of clips, the clip number, the clip size, and the disc size on the basis of the certification information recorded on the BD loaded into the BD drive 15. In the manner described above, the controller 11 of the BD reproduction device PL obtains the content forming information of the BD, which is formed from the number of layers, the number of clips, the clip number, the clip size, and the disc size. Then, the controller 11 of the BD reproduction device PL transmits the content forming information to the server 2 via the communication unit 12.

(4) Calculation of Degree of Similarity of Content Forming Information

In order to detect the package of the BD loaded into the BD reproduction device PL, the controller 21 of the server 2 compares the content forming information transmitted from the BD reproduction device PL with the content forming information for each package registered in the BDDB. Then, the controller 21 of the server 2 calculates the degree of similarity between the content forming information transmitted from the BD reproduction device PL and the content forming information for each package registered in the BDDB (this process will also be referred to as a degree-of-similarity calculation process).

Here, the method of calculating this degree of similarity will be described in detail. The degree of similarity is calculated for each content forming information of a package (also referred to as a degree-of-similarity calculation target package) set as a degree-of-similarity calculation target from among the packages separately registered in the BDDB by the controller 21 of the server 2.

For this degree-of-similarity calculation method, a point-deduction method is used. First, in the content forming information to be compared, the degree of similarity in a case where the clip sizes of all the clips completely match is set to a reference point (100 points). Then, in the content forming information to be compared, in a case where the number of clips and the clip size do not match, deduction points are calculated on the basis of the differences between the clip sizes and the ratio of the disc size to the clip size, and the deduction points are subtracted from the reference point, thereby calculating the degree of similarity.

Next, the method of calculating deduction points will be described. In the content forming information to be compared, clips of the clip number are set as a set, and the deduction points are calculated for each set. In the case of a clip for which another clip having the same clip number does not exist, the single clip is assumed to form a set of clips. Then, the deduction points are calculated on the basis of the number such that the basic deduction points calculated from the difference in the clip sizes of each set are multiplied by a first coefficient calculated on the basis of the ratio of the number of clips, in which the clip sizes match, to the total number of clips, and by a second coefficient calculated on the basis of the ratio of the clip size to the disc size.

First, a method of calculating the first coefficient will be described. The first coefficient is calculated for each degree-of-similarity calculation target package. First, in the content forming information to be compared, the clip size is compared for each set of clips. Then, the number such that 1 is added to the number of sets in which the clip sizes match is set as the number of matched clips. This is because as a result of some of clips being corrected due to a problem or the like found after sale, there is a case in which the clip sizes differ even with the same package, and the set of clips is regarded as being a set in which the clip sizes match even if the clip sizes differ. Furthermore, in the content forming information to be compared, the number of clips, which are not contained in the sets in which the clip sizes match, is calculated, and the number such that the number of clips and the number of matched clips are added is set as the total number of clips. The first coefficient is calculated by the following Expression (1) if the first coefficient is denoted as a1, the number of matched clips as n1, and the total number of clips as n2.

$$a1=n2/n1 \quad (1)$$

Next, a method of calculating the second coefficient will be described. The second coefficient is calculated for each set of clips. In the content forming information to be compared, the average of the disc sizes is calculated. Then, the average of the clip sizes is calculated for each set of clips. The second coefficient is calculated on the basis of the following Expression (2) if the second coefficient is denoted as a2, the average of the disc sizes as s1, and the average of the clip sizes as s2.

$$a2=1/(1-s2/s1) \quad (2)$$

As described above, the second coefficient calculation method is set in such a manner that the second coefficient is increased in proportion to the ratio of the clip size to the disc size. Here, it is considered that the probability that a clip having a high ratio of the clip size to the disc size is an important clip is high in the BD. Therefore, it is considered that the probability that the package of the degree-of-similarity calculation target whose clip size of the important clip differs from that of the BD loaded into the BD reproduction device PL is the package of the BD is low, and the second coefficient calculation method is set so that the more important the clip, the larger the deduction points.

Next, the method of calculating basic deduction points will be described. The basic deduction points are calculated for each set of clips. First, the difference between clip sizes is calculated for each set of clips. In the case of a set of clips in which there are no clips with the same clip number, the clip size of the clip is set as the difference of the clip size of the set. Then, the basic deduction points in a case where the difference of the clip sizes is 50 MB are set as 1 point, and the basic deduction points are calculated by using this as a reference. That is, the basic deduction points are calculated in accordance with the following Expression (3) if the basic deduction points are denoted as a3 and the difference between the clip sizes as k1, and if the unit of k1 is MB.

$$a3=k1/50 \quad (3)$$

Here, by considering that the larger difference between the clip sizes the degree-of-similarity calculation target package has, the lower the probability that it is the package of the BD loaded into the BD reproduction device PL, the method of calculating basic deduction points is set in such a manner that the basic deduction points are increased in proportion to the difference between the clip sizes.

Then, on the basis of the first coefficient and the second coefficient calculated as described above, the deduction points are calculated in accordance with the following Expression (4) for each set of clips if the deduction points are denoted as a4.

$$a4=a1\times a2\times a3 \qquad (4)$$

Then, the deduction points of the set of clips in which there are no clips having the same clip number are set to a lower limit of 4 points. In a case where the deduction points calculated in Expression (4) above are less than 4 points, the deduction points are converted into 4 points. Here, the fact that there are clips in which clips having the same clip number do not exist is considered to mean that the probability that the degree-of-similarity calculation target package is a package of the BD loaded into the BD reproduction device PL is low. Thus the lower limit of the deduction points is set so that the degree of similarity is decreased by a certain level or higher.

Then, when the deduction points are calculated for each set of all the clips in the content forming information to be compared as described above, then, the total of those deduction points is calculated. The score points obtained by subtracting the total of those deduction points from the reference point are set as the degree of similarity between the content forming information transmitted from the BD reproduction device PL and the content forming information of the degree-of-similarity calculation target package.

In the manner described above, in order to detect the package of the BD loaded into the BD reproduction device PL from the BDDB, the controller 21 of the server 2 calculates the degree of similarity between the content forming information transmitted from the BD reproduction device PL and the content forming information of the degree-of-similarity calculation target package.

In accordance with the above-described method, the degree of similarity among the BDs was actually calculated using 204 commercially available BDs. The BDs included BDs (for example, two BDs before and after title A was changed, and two BDs before and after title B was changed) of the package in which the structure of the content has been changed after sale. Furthermore, the BDs also included BDs (for example, a set of four BDs of Part 1 and four BDs of Part 2 of title C, and a set of six BDs of title D) of box sets of a television drama series. In addition, some BDs included BDs on which a movie has been recorded and BDs on which a concert has been recorded.

When the degree of similarity was calculated using such BDs, the degree of similarity between the two BDs before and after title A was changed, which are BDs of the package in which the structure of the content was changed, was 94.3 points. Furthermore, the degree of similarity between the two BDs before and after title B was changed, which are BDs of the package in which the structure of the content was likewise changed, was 99.8 points. Regarding the other BDs containing title C and title D, the degree of similarity was 20 points or lower among all the BDs.

As described above, in the 204 commercially available BDs used for this time, the degree of similarity, which was a low score point of 20 points or less, was obtained among all the different BDs of the package, and the degree of similarity, which was a high score point of 90 points or more, was obtained among all the BDs, which are the same package although the structure of the content is different. As a result of this, it is predicted that the controller 21 of the server 2 is able to detect the package of the BD loaded into the BD reproduction device PL at a high probability by calculating the degree of similarity in accordance with the above-described method.

(5) Package Detection Processing Procedure

Next, with reference to a sequence chart shown in FIG. 10 and a flowchart shown in FIG. 11, a description will be given in detail of the processing procedure in which the content-associated information providing system 1 detects the package of a BD loaded into the BD reproduction device PL (also referred to as a package detection processing procedure RT1). This package detection processing procedure RT1 is a processing procedure performed by the BD reproduction device PL and the server 2 in cooperation with each other. The controller 11 of the BD reproduction device PL performs the processing procedure in accordance with a program read from the storage unit 13 of the BD reproduction device PL, and the controller 21 of the server 2 performs the processing procedure in accordance with a program read from the storage unit 23 of the server 2.

When the reproduction of a BD is instructed through, for example, an operation of the operation unit 14, the controller 11 of the BD reproduction device PL starts the package detection processing procedure RT1, and the process then proceeds to step SP1. Then, the controller 11 of the BD reproduction device PL reads certification information from the BD loaded into the BD drive 15, and obtains the content forming information from the certification information in accordance with the above-described method. The process then proceeds to step SP2.

In step SP2, the controller 11 of the BD reproduction device PL transmits the obtained content forming information to the server 2 via the communication unit 12. FIG. 12 shows the data structure of the content forming information to be transmitted to the server 2 at this time. When the controller 21 of the server 2 receives the content forming information transmitted from the BD reproduction device PL via the communication unit 22, in step SP10, the controller 21 calculates a hash value by using a hash function, such as, for example, SHA-1 or MD5, on the basis of the content forming information. Then, the controller 21 of the server 2 uses this hash value as the unique disc ID of the BD loaded into the BD reproduction device PL, and the process then proceeds to step SP11.

In step SP11, the controller 21 of the server 2 searches the BDDB stored in the storage unit 23 for a package having a unique disc ID matching the unique disc ID of the BD loaded into the BD reproduction device PL (also referred to as a unique disc ID matching search). This makes it possible to search the BDDB for a package having the structure of the content matching that of the BD loaded into the BD reproduction device PL, that is, the package of the BD. In the search, since only the condition of matching the unique disc ID of the BD loaded into the BD reproduction device PL is used as a search condition, it is possible to perform a search at high speed. Then, the controller 21 of the server 2 obtains the search result as a result of the unique disc ID matching search, and the process then proceeds to step SP12.

In step SP12, the controller 21 of the server 2 determines whether or not the search result of the unique disc ID matching search was 0 points.

At this point, when an affirmative result is obtained in step SP12 as a result of the fact that the search result by the unique disc ID matching search is 0 points, this means that a package having the structure of content matching that of the BD loaded into the BD reproduction device PL does not exist in the BDDB. Therefore, this means that there is a probability that part of the structure of the content has been changed due to, for example, a problem after sale in the package of the BD loaded into the BD reproduction device PL. At this time, the process of the controller 21 of the server 2 proceeds to step SP13.

In step SP13, the controller 21 of the server 2 performs a degree-of-similarity calculation target package search for searching for a package for which the degree of similarity is calculated from among the packages registered in the BDDB. The process then proceeds to step SP14.

Here, the degree-of-similarity calculation target package search will be described more specifically. By using a search condition that is set in advance by another process that is not described in detail, the controller 21 of the server 2 searches the BDDB for a package having content forming information, which is predicted to have a high degree of similarity. For example, here, the following are used as the search conditions that the number of layers is the same as that of the received content forming information, the difference between the disc sizes is 1.2 GB or smaller, and the difference between the number of clips is 2 or less.

In packages of commercially available BDs (for example, title E), a degree-of-similarity calculation target package search was actually performed using these search conditions. As search targets, about 200 packages of commercially available BDs were used. As a result, 2 to 4% of the about 200 packages of commercially available BDs were found as packages having the content forming information, which were predicted to have a high degree of similarity with the content forming information of the title E.

Then, in step SP14, the controller 21 of the server 2 sets the package found in the search as a degree-of-similarity calculation target package, and the process then proceeds to step SP15.

As described above, the controller 21 of the server 2 performs a degree-of-similarity calculation process on only the package found by the search, making it possible to shorten the time necessary for the processing and reduce the load on the server 2 when compared to the case in which such processing is performed on all the packages registered in the BDDB.

In step SP15, the controller 21 of the server 2 starts, as a subroutine, a degree-of-similarity calculation processing procedure SRT2 for performing a degree-of-similarity calculation process shown in FIG. 11, and the process then proceeds to step SP30. In step SP30, the controller 21 of the server 2 obtains, from the BDDB, the content forming information of a package (also referred to as a degree of similarity-not-yet-calculated package) for which the degree of similarity has not yet been calculated from among the packages set as the degree-of-similarity calculation target packages. The process then proceeds to step SP31.

In step SP31, the controller 21 of the server 2 calculates the number of matched clips and the total of number of clips on the basis of the content forming information received from the BD reproduction device PL and the content forming information of the degree of similarity-not-yet-calculated package obtained in step SP31. The process then proceeds to step SP32.

In step SP32, on the basis of the number of matched clips and the total number of clips calculated in step SP31, the controller 21 of the server 2 calculates the first coefficient of the degree of similarity-not-yet-calculated package in accordance with Expression (1) above. The process then proceeds to step SP33.

In step SP33, in the content forming information to be compared, the controller 21 of the server 2 calculates, for each set of clips for which the deduction points have not yet been calculated (also referred to as a deduction-points-not-yet-calculated clip set), a second coefficient of the deduction-points-not-yet-calculated clip set in accordance with Expression (2) above. The process then proceeds to step SP34.

In step SP34, the controller 21 of the server 2 calculates the basic deduction points of the deduction-points-not-yet-calculated clip set in accordance with expression (3) above. The process then proceeds to step SP35.

In step SP35, on the basis of the first coefficient of the degree of similarity-not-yet-calculated package, the second coefficient of the deduction-points-not-yet-calculated clip set, and the basic deduction points, which are calculated in steps SP32 to SP35, the controller 21 of the server 2 calculates the deduction points of the deduction-points-not-yet-calculated clip set in accordance with Expression (4) above. The process then proceeds to step SP36.

In step SP36, the controller 21 of the server 2 determines whether or not the deduction-points-not-yet-calculated clip set is a set of clips in which there are no clips having the same clip number.

Here, when an affirmative result is obtained in step SP36 as a result of the fact that the deduction-points-not-yet-calculated clip set is a set of clips in which there are no clips having the same clip number, the process of the controller 21 of the server 2 proceeds to step SP37.

In step SP37, the controller 21 of the server 2 determines whether or not the deduction points of the deduction-points-not-yet-calculated clip set are less than 4 points.

Here, when an affirmative result is obtained in step SP37 as a result of the fact that the deduction points of the deduction-points-not-yet-calculated clip set are less than 4 points, the process of the controller 21 of the server 2 proceeds to step SP38.

In step SP38, the controller 21 of the server 2 sets the deduction points of the deduction-points-not-yet-calculated clip set to 4 points. The process then proceeds to step SP39.

On the other hand, when a negative result is obtained in step SP36 as a result of the fact that the deduction-points-not-yet-calculated clip set is not a set of clips in which there are no clips having the same clip number, the process of the controller 21 of the server 2 proceeds to step SP39.

On the other hand, when a negative result is obtained in step SP37 as a result of the fact that the deduction points of the deduction-points-not-yet-calculated clip set are 4 points or more, the process of the controller 21 of the server 2 proceeds to step SP39.

When a negative result is obtained in step SP36 or in step SP37, or when step SP38 is completed, in step SP39, the controller 21 of the server 2 determines whether or not the deduction points have been calculated completely with respect to all the sets of the clips in the content forming information to be compared.

Here, when a negative result is obtained in step SP3 as a result of the fact that there are a set of clips for which the deduction points have not yet been calculated, the process of the controller 21 of the server 2 returns to step SP33, where a process for calculating the deduction points is performed in the deduction-points-not-yet-calculated clip set.

On the other hand, when an affirmative result is obtained in step SP39 as a result of the fact that the deduction points have been calculated with respect to all the sets of clips in the content forming information to be compared, this means that the calculation of the deduction points in the degree of similarity-not-yet-calculated package is completed. Then, the process of the controller 21 of the server 2 proceeds to step SP40.

In step SP40, the controller 21 of the server 2 calculates the total of the deduction points of all the sets of the clips in the degree of similarity-not-yet-calculated package, and calculates the degree of similarity of the degree of similarity-not-yet-calculated package by subtracting the total from the reference point. The process then proceeds to step SP41.

In step SP41, the controller 21 of the server 2 determines whether or not the degree of similarity has been calculated with respect to all the packages, which are the degree-of-similarity calculation target packages.

At this point, when a negative result is obtained in step SP41 as a result of the fact that there is a package for which the degree of similarity has not yet been calculated, the process of the controller 21 of the server 2 returns to step SP30, where a process for calculating the degree of similarity is performed in the degree of similarity-not-yet-calculated package.

On the other hand, when an affirmative result is obtained in step SP42 as a result of the fact that the degree of similarity has been calculated with respect to all the packages, which are degree-of-similarity calculation target packages, the process of the controller 21 of the server 2 proceeds to step SP42.

Figure 10:
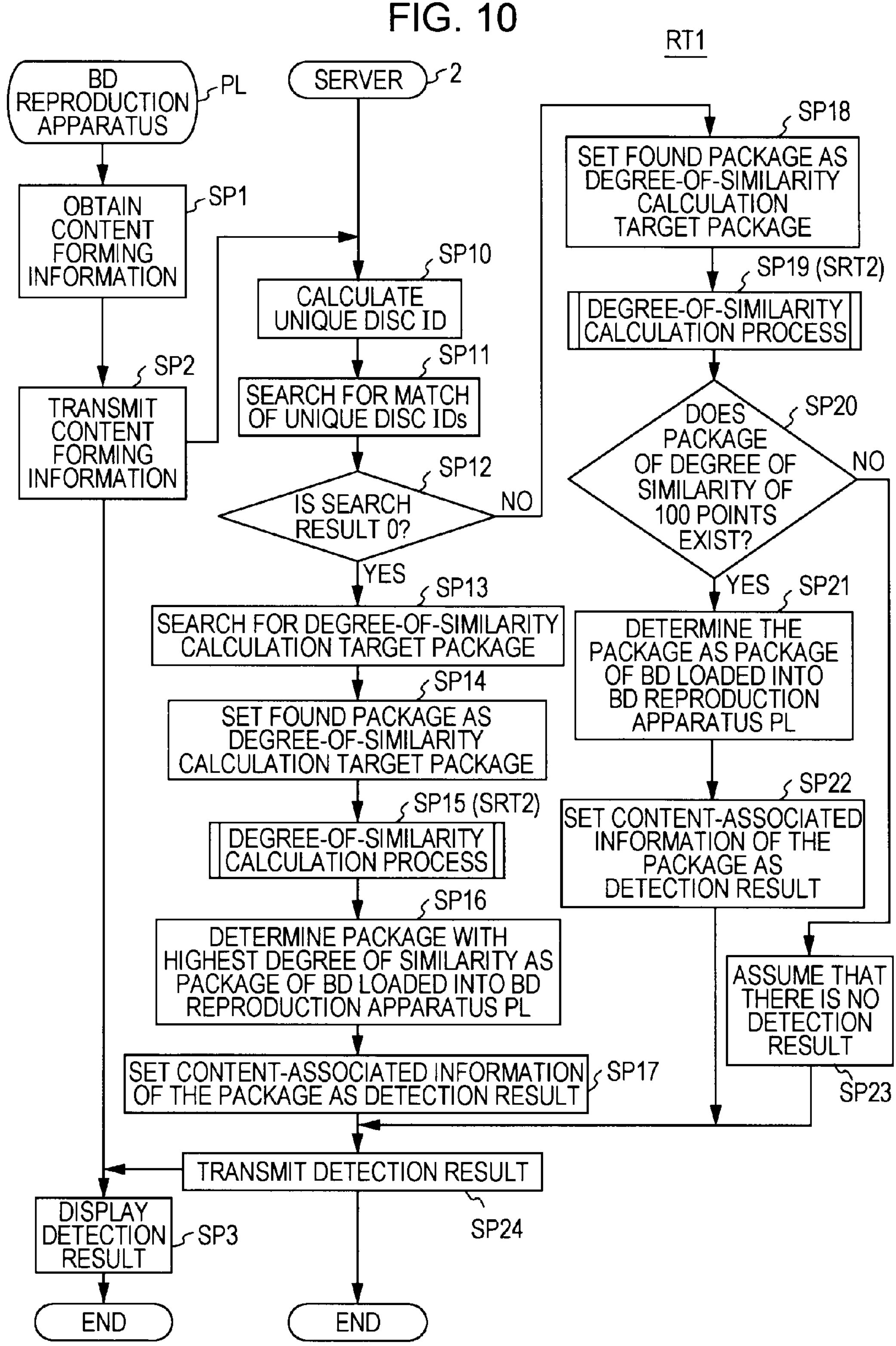
FIG. 10 is a sequence chart showing a package detection processing procedure.

In step SP42, the controller 21 of the server 2 completes the degree-of-similarity calculation processing procedure SRT2, and the process returns to step SP15 of the package detection processing procedure RT1 shown in FIG. 10. The process then proceeds to step SP16.

In step SP16, the controller 21 of the server 2 determines the package having the highest degree of similarity among the degrees of similarity calculated in the degree-of-similarity calculation processing procedure SRT2 as the package of the BD loaded into the BD reproduction device PL. Then, the process of the controller 21 of the server 2 proceeds to step SP17.

In step SP17, the controller 21 of the server 2 obtains content-associated information corresponding to the package determined in step SP16 from the BDDB, and sets the content-associated information as a detection result to be transmitted to the BD reproduction device PL.

On the other hand, when a negative result is obtained in step SP12 as a result of the fact that the search result by the unique disc ID matching search is not 0 points, this means that there is a package whose unique disc ID matches that of the BD loaded into the BD reproduction device PL. At this time, the package whose unique disc ID matches that of the BD loaded into the BD reproduction device PL is considered to have a high probability that it is a package of the BD loaded into the BD reproduction device PL. However, since the unique disc ID is a value such that content forming information is calculated using a hash function, in rare cases, they have the same value even though the content forming information differs. Therefore, a degree-of-similarity calculation process is performed on a package whose unique disc ID matches that of the BD loaded into the BD reproduction device PL, and the degree of similarity of the content forming information is confirmed. Then, the process of the controller 21 of the server 2 proceeds to step SP18.

In step SP18, the controller 21 of the server 2 sets the package found by the unique disc ID matching search as a degree-of-similarity calculation target package, and the process then proceeds to step SP19.

In step SP19, similarly to the case in step SP15, the controller 21 of the server 2 performs the degree-of-similarity calculation processing procedure SRT2, and the process then proceeds to the next step SP20.

In step SP20, the controller 21 of the server 2 determines whether or not there is a package in which the degree of similarity calculated in the degree-of-similarity calculation processing procedure SRT2 is 100 points.

At this point, when an affirmative result is obtained in step SP20 as a result of the fact that there is a package whose degree of similarity is 100 points, the process of the controller 21 of the server 2 proceeds to step SP21.

In step SP21, the package whose degree of similarity is 100 points is determined to be the package of the BD loaded into the BD reproduction device PL. Then, the process of the controller 21 of the server 2 proceeds to step SP22.

In step SP22, the controller 21 of the server 2 obtains content-associated information corresponding to the determined package from the BDDB, and sets the content-associated information as a detection result to be transmitted to the BD reproduction device PL. The process then proceeds to step SP24.

On the other hand, when a negative result is obtained in step SP2 as a result of the fact that there are no packages whose degree of similarity is 100 points, this means that the package of the BD loaded into the BD reproduction device PL has not been registered. Then, the process of the controller 21 of the server 2 proceeds to step SP23.

In step SP23, the controller 21 of the server 2 sets information in which there are no detection results as a detection result to be transmitted to the BD reproduction device PL. The process then proceeds to step SP24.

When step SP17, SP22, or SP23 is completed, in step SP24, the controller 21 of the server 2 transmits the set detection result to the BD reproduction device PL via the communication unit 22.

When the controller 11 of the BD reproduction device PL receives the detection result transmitted by the server 2 via the communication unit 12, in step SP3, the controller 11 causes the received detection result to be displayed on the display unit 17. This completes the package detection processing procedure RT1.

In accordance with such a package detection processing procedure RT1, the content-associated information providing system 1 detects the package of the BD loaded into the BD reproduction device PL, and provides the content-associated information corresponding to the package to the user.

(6) Operation and Advantages

In the above configuration, for example, when the reproduction of a BD is instructed, the BD reproduction device PL reads, from the BD loaded into the BD reproduction device PL, certification information with which AACSLA certifies the authenticity of the content recorded on the BD.

Then, the BD reproduction device PL obtains, from the certification information, content forming information formed of information regarding the structure of content, such as the clip size, and transmits the content forming information to the server 2.

Then, the server 2 calculates the unique disc ID, which is a hash value calculated from the content forming information received from the BD reproduction device PL, and performs a unique disc ID matching search by using the unique disc ID.

When the search result of the unique disc ID matching search is 0, this means that there is a probability that the structure of the content has been changed in the package of the BD loaded into the BD reproduction device PL.

At this time, the server 2 performs a degree-of-similarity calculation target package search for searching for a package whose degree of similarity is predicted to be high, and sets the found package as a degree-of-similarity calculation target package.

As a result, by narrowing the packages for which the degree of similarity is calculated, it is possible for the server 2 to shorten the time necessary for the degree-of-similarity calculation process.

Then, the server 2 performs a degree-of-similarity calculation process for calculating the degree of similarity between the content forming information of the BD loaded into the BD reproduction device PL and the content forming information of the degree-of-similarity calculation target package. In the degree-of-similarity calculation process, the content forming information of the BD loaded into the BD reproduction device PL is compared with the content forming information of the degree-of-similarity calculation target package, thereby calculating the difference in the content forming information, such as the difference in the clip sizes, and calculating the degree of similarity by using the difference.

Then, the server 2 determines the package having the highest degree of similarity among the degrees of similarity calculated in the degree-of-similarity calculation process as the package of the BD loaded into the BD reproduction device PL. Then, the server 2 obtains the content-associated information corresponding to the package from the BDDB, and transmits the information to the BD reproduction device PL.

As described above, the server 2 is able to detect the package of the BD loaded into the BD reproduction device PL, and is able to provide the content-associated information corresponding to the package to the BD reproduction device PL.

Then, the BD reproduction device PL receives the content-associated information transmitted from the server 2, and causes the display unit 17 to display the information.

As described above, it is possible for the BD reproduction device PL to provide the content-associated information corresponding to the package of the BD loaded into the BD reproduction device PL to the user.

With the above configuration, the BD reproduction device PL obtains the content forming information from the BD loaded into the BD reproduction device PL and transmits it to the server 2. Then, the server 2 compares the received content forming information of the BD loaded into the BD reproduction device PL with the content forming information for each package registered in the BDDB, and calculates the degrees of similarity of them. Then, the server 2 determines the package having the content forming information of the highest degree of similarity to be the package of the BD loaded into the BD reproduction device PL, thereby detecting the package of the BD loaded into the BD reproduction device PL.

As a result of the above, it is possible for the content-associated information providing system 1 to detect the package of the BD loaded into the BD reproduction device PL even if a difficult operation of pre-registering which package each of all the CCIDs is linked to in a database is not performed.

As a result, it is possible for the content-associated information providing system 1 to easily detect the package of the BD loaded into the BD reproduction unit PL.

(7) Other Embodiments

(7-1) Other Embodiment 1

In the above-described embodiments, the server 2 determines the package having the highest degree of similarity among the degrees of similarity calculated in the degree-of-similarity calculation process to be the package of the BD loaded into the BD reproduction device PL.

The present invention is not limited to these embodiments. The server 2 may determine a package having a degree of similarity of a certain level or higher among the degrees of similarity calculated in the degree-of-similarity calculation process to be the package of the BD loaded into the BD reproduction device PL.

At this time, in a case where there are a plurality of packages having a degree of similarity of a certain level or higher, the server 2 may transmit the list of the packages to the BD reproduction device PL.

For example, at this time, in a case where a degree of similarity of 90 points or higher is set as a threshold value and there are a plurality of packages having a degree of similarity of 90 points or more, the server 2 creates a list of titles corresponding to those packages and transmits the list to the BD reproduction device PL. Then, the BD reproduction device PL causes the display unit 17 to display the list. Then, the BD reproduction device PL obtains, from the server 2, the content-associated information corresponding to the package selected by the user operation via the operation unit 14, and causes the display unit 17 to display the content-associated information, thereby providing it to the user.

As a result of the above, it is possible for the content-associated information providing system 1 to detect a package having a high probability of being a package of the BD loaded into the BD reproduction device PL, thereby making it possible to allow the user to select the package of the BD loaded into the BD reproduction device from among the packages.

(7-2) Other Embodiment 2

Furthermore, in the above-described embodiments, the server 2 transmits the content-associated information corresponding to the package having the highest degree of similarity among the degrees of similarity calculated in the degree-of-similarity calculation process to the BD reproduction device PL.

The present invention is not limited to this. In a case where there are a plurality of packages having the highest degree of similarity among the degrees of similarity calculated in the degree-of-similarity calculation process, for example, the server 2 may transmit a list of those packages to the BD reproduction device PL. At this time, for example, the BD reproduction device PL may cause the display unit 17 to display the list, obtain content-associated information corresponding to the package selected by the user operation from the server 2, and provide the content-associated information to the user.

Furthermore, the present invention is not limited to this. The server 2 may transmit, for example, a list of all the packages for which the degree of similarity has been calculated in the degree-of-similarity calculation process to the BD reproduction device PL. At this time, for example, the BD reproduction device PL may display the list on the display unit 17, obtain the content-associated information corresponding to the package selected by the user operation from the server 2, and provide the content-associated information to the user.

More specifically, for example, the server 2 creates a list in which the titles corresponding to all the packages for which the degree of similarity has been calculated in the degree-of-similarity calculation process are arranged in descending order of degree of similarity, and transmits the list to the BD reproduction device PL. The BD reproduction device PL causes the display unit 17 to display the list. Then, the BD reproduction device PL obtains the content-associated information corresponding to the package selected by the user operation via the operation unit 14 from the server 2, and displays the content-associated information on the display unit 17, thereby providing it to the user.

(7-3) Other Embodiment 3

Furthermore, in the above-described embodiments, the server 2 performs a degree-of-similarity calculation process on the package found by the unique disc ID matching search, and determines the package of the BD loaded into the BD reproduction device PL by using the degree of similarity.

The present invention is not limited to this. The server 2 may not perform a degree-of-similarity calculation process on the package found by the unique disc ID matching search, and may determine the package found by the search to be the package of the BD loaded into the BD reproduction device PL.

As a result of the above, since the server 2 does not perform a degree-of-similarity calculation process on the package found by the unique disc ID matching search, it is possible to detect the package of the BD loaded into the BD reproduction device PL more early.

(7-4) Other Embodiment 4

Furthermore, in the above-described embodiments, the BD reproduction device PL obtains, from the information (certification information) indicating that certification has been performed on the BD by AACSLA, the content forming information of the BD loaded into the BD reproduction device PL.

The present invention is not limited to this. In addition, if there is information that certifies that the content of the information recording medium is legitimate and from which content forming information can be obtained, the content forming information may be obtained on the basis of the information.

Furthermore, the present invention is not limited to this. In addition, content forming information may be obtained on the basis of various kinds of information as long as these are information from which content forming information can be obtained.

(7-5) Other Embodiment 5

Furthermore, in the above-described embodiments, as the content forming information used in the content-associated information providing system 1, the total number of layers, the total number of clips, the ordinal number of each clip, the stream size of each clip, and the total stream size of all the clips are used.

The present invention is not limited to this. As the content forming information used in the content-associated information providing system 1, some of the above-described information may be used.

Furthermore, the present invention is not limited to this. In addition, various kinds of information may be used as content forming information as long as these are information which is related to the structure of content and from which a package can be determined by calculating the degree of similarity thereof.

(7-6) Other Embodiment 6

Furthermore, in the above-described embodiments, the server 2 detects the package of a BD loaded into the BD reproduction device PL and transmits the content-associated information corresponding to the package to the BD reproduction device PL.

The present invention is not limited to this. The server 2 may use the detected package for various processing, such as, for example, transmitting the title of the detected package to a server (not shown) in the network NT, the server recording the number of reproductions of the package.

(7-7) Other Embodiment 7

Furthermore, in the above-described embodiments, the BD reproduction device PL starts the package detection processing procedure RT1 at the timing at which the reproduction of a BD is instructed by user operation.

The present invention is not limited to this. The BD reproduction device PL may start the package detection processing procedure RT1 at various other timings, such as, for example, a timing at which a BD is loaded to the BD drive 15.

(7-8) Other Embodiment 8

In the above-described embodiments, the server 2 uses, as search conditions used in the degree-of-similarity calculation target package search, that the number of layers is the same as that in the received content forming information, the difference between the disc sizes is 1.2 GB or smaller, and the difference between the number of clips is 2 or less.

The present invention is not limited to this. The server 2 may use, as search conditions in the degree-of-similarity calculation target package search, various other conditions, such as, for example, conditions that are set in such a manner that the time taken for the search and the number of search results are adjusted in accordance with various situations.

(7-9) Other Embodiment 9

Furthermore, in the above-described embodiments, in a case where there is no package whose degree of similarity is 100 points among the packages found in the unique disc ID matching search, the server 2 sets the number of detection results to zero.

The present invention is not limited to this. In this case, the server 2 may perform, for example, the same processing as in the case in which the search results in the unique disc ID matching search are 0 points. That is, at this time, more specifically, the server 2 performs a degree-of-similarity calculation target package search and a degree-of-similarity calculation process by using the content forming information transmitted from the BD reproduction device PL. Then, the server 2 determines the package having the highest degree of similarity among the calculated degrees of similarity to be the package of the BD loaded into the BD reproduction device PL and sets the content-associated information of the package as the detection result.

As a result of the above, it is possible for the content-associated information providing system 1 to detect the package of the BD loaded into the BD reproduction device PL at all times and provide the content-associated information of the package to the user.

(7-10) Other Embodiment 10

Furthermore, in the above-described embodiments, a case in which the present invention is applied to an apparatus and a system that detect a package of a BD has been described.

The present invention is not limited to this. The present invention may be applied to an apparatus and a system that detect packages of various other information recording media as long as these are information recording media, which are set as packages and from which the structure of content can be obtained, such as, for example, a DVD.

(7-11) Other Embodiment 11

Furthermore, in the above-described embodiments, a case in which packages are shown as being set as a product for sale and the present invention is applied to the apparatus and the system that detect such packages has been described.

The present invention is not limited to this. In addition, the present invention may be applied to an apparatus and a system that detect various other packages as long as these are packages for which content forming information can be registered in advance in a database, such as, for example, a package that is distributed free of charge as a promotion.

(7-12) Other Embodiment 12

Furthermore, in the above-described embodiments, a program for executing the package detection processing procedure RT1 is stored in advance in the storage unit 13 of the BD reproduction device PL and the storage unit 23 of the server 2.

The present invention is not limited to this. This program may be downloaded by the BD reproduction device PL from a server (not shown) in the network NT via the communication unit 12, and may be installed into the storage unit 13.

Furthermore, the present invention is not limited to this. This program may be downloaded by the server 2 from a server (not shown) in the network NT via the communication unit 22 and installed into the storage unit 23.

Furthermore, the present invention is not limited to this. This program may be recorded in advance on a recording medium, such as an optical disc, and the BD reproduction device PL may read this program from the information recording medium and install it into the storage unit 13.

In this case, it is assumed that a medium drive capable of reading a program from an information recording medium, such as an optical disc, is separately connected to the BD reproduction device PL.

Furthermore, the present invention is not limited to this. This program may be recorded in advance on a recording medium, such as an optical disc, and the server 2 may read this program from the recording medium and install it into the storage unit 23.

In this case, it is assumed that a medium drive capable of reading a program from an information recording medium, such as an optical disc, is separately connected to the server 2.

(7-13) Other Embodiment 13

Furthermore, in the above-described embodiments, the content-associated information providing system 1 serving as an information processing system is provided with the server 2 serving as an information processing apparatus and the BD reproduction device PL serving as a reproduction device. Then, in the above-described embodiments, the server 2 serving as an information processing apparatus is provided with the communication unit 22 serving as a communication unit, the controller 21, and the storage unit 23, which serve as a degree-of-similarity calculation unit, a package determination unit, a package search unit, and a content-associated information obtaining unit.

The present invention is not limited to this. The above units may be replaced with various other hardware as long as these have identical functions. Furthermore, for example, each of the communication unit, the degree-of-similarity calculation unit, the package determination unit, the package search unit, and the content-associated information obtaining unit may be realized using individual hardware or software.

Furthermore, in the above-described embodiments, the BD reproduction device PL serving as a reproduction device is provided with the BD drive 15 and the reproduction unit 16 serving as reproduction units, the controller 11 and the BD drive 15 serving as content forming information obtaining units, the communication unit 12 serving as a communication unit, and the controller 11 serving as a display controller.

The present invention is not limited to this. The above units may be replaced with various other hardware as long as they have identical functions. Furthermore, for example, each of the reproduction unit, the content forming information obtaining unit, the communication unit, and the display controller may be realized by individual hardware or software.

(7-14) Other Embodiment 14

Furthermore, the present invention is not limited to the above-described embodiments and other embodiments 1 to 13 that have been described thus far. That is, in the present invention, an embodiment in which some or the whole of the above-described embodiments and other embodiments 1 to 13 described thus far are combined as desired, or an embodiment in which some of them are extracted, fall under the scope of the present invention.

For example, other embodiments 3 and 7 may be combined. For example, at this time, the BD reproduction device PL does not wait for the instruction of BD reproduction through user operation and starts the package detection processing procedure RT1 at the timing at which a BD is loaded into the BD drive 15.

As a result of the above, the content-associated information providing system 1 is able to complete the package detection processing procedure RT1 more early. Therefore, it is possible for the content-associated information providing system 1 to detect a package loaded into the BD reproduction device PL more early and provide the content-associated information corresponding to the package to the user.

The present invention can be widely utilized in, for example, a system that detects a package of an information recording medium and that provides content-associated information corresponding to the package.

The present application contains subject matter related to that disclosed in Japanese Priority Patent Application JP 2008-224971 filed in the Japan Patent Office on Sep. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:

a communication unit configured to receive, from a reproduction device that reproduces content recorded on a loaded recording medium, content forming information regarding the structure of the content, the content forming information including a number of items of data forming content recorded on the recording medium and a size of each of the items of data;

a degree-of-similarity calculation unit configured to compare the content forming information received by the communication unit with content forming information registered in advance for each package of an information recording medium in a predetermined database and calculate a degree of similarity between the content forming information received by the communication unit and the content forming information registered in advance in the database, the degree-of-similarity calculation unit calculating the degree of similarity based on the number of items of data forming content recorded on the recording medium and the size of each of the items of data; and a package determination unit configured to determine the package of the information recording medium loaded into the reproduction device by using the degree of similarity calculated by the degree-of-similarity calculation unit.

2. The information processing apparatus according to claim 1, wherein the degree-of-similarity calculation unit calculates a difference between the content forming information received by the communication unit and the content forming information registered in advance for each package of an information recording medium in the database and calculates the degree of similarity on the basis of the difference.

3. The information processing apparatus according to claim 2, further comprising:

a content-associated information obtaining unit configured to obtain, from a predetermined database, content-associated information associated with content corresponding to the package determined by the package determination unit, wherein the communication unit transmits the content-associated information obtained by the content-associated information obtaining unit to the reproduction device.

4. The information processing apparatus according to claim 2, further comprising:

a package search unit configured to compare predetermined information contained in the content forming information received by the communication unit with the predetermined information contained in the content forming information registered in advance for each package of an information recording medium in the database and search for a package having content forming information whose degree of similarity is predicted to be high on the basis of the result of the comparison, wherein the degree-of-similarity calculation unit calculates a difference between the content forming information received by the communication unit and the content forming information of the package found by the package search unit and calculates the degree of similarity on the basis of the difference.

5. The information processing apparatus according to claim 2, wherein the package determination unit determines a package having the highest degree of similarity among the degrees of similarity calculated by the degree-of-similarity calculation unit to be a package of the information recording medium loaded into the reproduction device.

6. The information processing apparatus according to claim 2, wherein the package determination unit determines a package having a degree of similarity of a certain level or higher among the degrees of similarity calculated by the degree-of-similarity calculation unit to be the package of the information recording medium loaded into the reproduction device, and wherein when there are two or more packages determined by the package determination unit, the communication unit transmits a list of the packages to the reproduction device.

7. The information processing apparatus according to claim 2, wherein on the recording medium, the content forming information is recorded as part of certification information with which a third party management organization certifies that content recorded on the recording medium is legitimate, and wherein the communication unit receives, from the reproduction device, the content forming information obtained on the basis of the content forming information recorded as part of the certification information on the recording medium.

8. An information processing method comprising:

receiving, by a communication unit, from a reproduction device that reproduces content recorded on a loaded recording medium, content forming information regarding the structure of the content, the content forming information including a number of items of data forming content recorded on the recording medium and a size of each of the items of data;

comparing, by a degree-of-similarity calculation unit, the content forming information received by the communication unit with content forming information registered in advance for each package of an information recording medium in a predetermined database, and calculating a degree of similarity between the content forming information received by the communication unit and the content forming information registered in advance in the database, the degree-of-similarity calculation unit calculating the degree of similarity based on the number of items of data forming content recorded on the recording medium and the size of each of the items of data; and determining, by a package determination unit, the package of the information recording medium loaded into the reproduction device by using the degree of similarity calculated by the degree-of-similarity calculation unit.

9. A reproduction device comprising:

a reproduction unit configured to reproduce content recorded on a loaded recording medium;

a content forming information obtaining unit configured to obtain content forming information regarding the structure of the content, the content forming information including a number of items of data forming content recorded on the recording medium and a size of each of the items of data; and a communication unit configured to transmit the content forming information obtained by the content forming information obtaining unit to an information processing apparatus that receives the content forming information, compares the received content forming information with content forming information registered in advance for each package of an information recording medium in a predetermined database, calculates a degree of similarity between the received content forming information and the content forming information registered in advance in the database, the information processing apparatus calculating the degree of similarity based on the number of items of data forming content recorded on the recording medium and the size of each of the items of data, and determines the package of the loaded information recording medium by using the calculated degree of similarity.

10. The reproduction device according to claim 9, wherein the communication unit includes a display controller configured to receive content-associated information regarding content corresponding to the package of the loaded information recording medium from the information processing apparatus and cause a display unit to display the content-associated information received by the communication unit.

11. The reproduction device according to claim 9, wherein on the recording medium, the content forming information is recorded as part of certification information with which a third party management organization certifies that content recorded on the recording medium is legitimate, and wherein the content forming information obtaining unit obtains the content forming information on the basis of the content forming information recorded as part of the certification information on the recording medium.

12. An information processing method comprising:

obtaining, by a content forming information obtaining unit, content forming information regarding the structure of content recorded on a loaded recording medium, the content forming information including a number of items of data forming content recorded on the recording medium and a size of each of the items of data; and transmitting, by a communication unit, the content forming information obtained by the content forming information obtaining unit to an information processing apparatus that receives the content forming information, compares the received content forming information with content forming information registered in advance for each package of an information recording medium in a predetermined database, calculates a degree of similarity between the received content forming information and the content forming information registered in advance in the database, the information processing apparatus calculating the degree of similarity based on the number of items of data forming content recorded on the recording medium and the size of each of the items of data, and determines the package of the loaded information recording medium by using the calculated degree of similarity.

13. An information processing system comprising:

a reproduction device including a reproduction unit configured to reproduce content recorded on a loaded recording medium, a content forming information obtaining unit configured to obtain content forming information regarding the structure of the content, the content forming information including a number of items of data forming content recorded on the recording medium and a size of each of the items of data, and a communication unit configured to transmit the content forming information obtained by the content forming information obtaining unit to the outside; and an information processing apparatus including a communication unit configured to receive the content forming information from the reproduction device, a degree-of-similarity calculation unit configured to compare the content forming information received by the communication unit with content forming information registered in advance for each package of an information recording medium in a predetermined database, and calculate a degree of similarity between the content forming information received by the communication unit and the content forming information registered in advance in the database, the degree-of-similarity calculation unit calculating the degree of similarity based on the number of items of data forming content recorded on the recording medium and the size of each of the items of data, and a package determination unit configured to determine the package of the loaded information recording medium loaded into the reproduction device by using the degree of similarity calculated by the degree-of-similarity calculation unit.

* * * * *